United States Patent
Beresford et al.

(10) Patent No.: US 10,384,306 B1
(45) Date of Patent: Aug. 20, 2019

(54) LASER CUTTING ARRAY WITH MULTIPLE LASER SOURCE ARRANGEMENT

(71) Applicant: Seagate Technology LLC, Cupertino, CA (US)

(72) Inventors: Ian J. Beresford, Milpitas, CA (US); Joachim Walter Ahner, Livermore, CA (US); David M. Tung, Livermore, CA (US); Weilu H. Xu, San Jose, CA (US); Kuo-Hsing Hwang, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 224 days.

(21) Appl. No.: 15/171,697

(22) Filed: Jun. 2, 2016

Related U.S. Application Data

(60) Provisional application No. 62/173,834, filed on Jun. 10, 2015.

(51) Int. Cl.
| | |
|---|---|
| *B23K 26/08* | (2014.01) |
| *B23K 26/06* | (2014.01) |
| *B29D 17/00* | (2006.01) |
| *C03B 33/10* | (2006.01) |
| *C03C 23/00* | (2006.01) |
| *B23K 26/38* | (2014.01) |
| *B23K 26/402* | (2014.01) |

(Continued)

(52) U.S. Cl.
CPC ...... *B23K 26/0608* (2013.01); *B23K 26/0853* (2013.01); *B23K 26/0869* (2013.01); *B23K 26/38* (2013.01); *B23K 26/402* (2013.01); *B29D 17/00* (2013.01); *C03B 33/102* (2013.01); *C03C 23/0025* (2013.01); *B23K 2103/42* (2018.08); *B23K 2103/54* (2018.08); *B29K 2105/253* (2013.01)

(58) Field of Classification Search
CPC ............ B23K 26/0608; B23K 26/0853; B23K 26/0869; B23K 26/38; B23K 26/405; B23K 2203/42; B23K 2203/54; B29D 17/00; C03B 33/102; C03C 23/0025; B29K 2105/253
See application file for complete search history.

(56) References Cited

U.S. PATENT DOCUMENTS

| | | | | |
|---|---|---|---|---|
| 4,914,272 A | * | 4/1990 | Ito .................. | B23K 1/0056 219/121.63 |
| 5,981,902 A | | 11/1999 | Arita et al. | |

(Continued)

FOREIGN PATENT DOCUMENTS

EP    1271484 A2    1/2003

OTHER PUBLICATIONS

Hildebranda et al.,"Advanced Analysis of Laser Beam Polishing of Quartz Glass Surfaces," Physics Procedia vol. 39, 2012, pp. 277-285. 9 pages.

(Continued)

*Primary Examiner* — Queenie S Dehghan

(57) ABSTRACT

Provided herein is an apparatus that includes a first and second laser source. The first and second laser sources are each operable to cut a substrate and are each independently movable with respect to one another. Further, the first and second laser sources are included within a multitude of laser sources that are arranged in a circular array.

20 Claims, 8 Drawing Sheets

(51) Int. Cl.
*B29K 105/00* (2006.01)
*B23K 103/00* (2006.01)

(56) References Cited

U.S. PATENT DOCUMENTS

| | | | |
|---|---|---|---|
| 6,008,468 A * | 12/1999 | Tanaka | B23K 26/0823 |
| | | | 219/121.7 |
| 6,229,670 B1 | 5/2001 | Kuo et al. | |
| 6,501,047 B1 | 12/2002 | Xuan et al. | |
| 7,078,650 B2 * | 7/2006 | Gross | B23K 26/067 |
| | | | 219/121.71 |
| 8,451,536 B2 * | 5/2013 | Tsukihara | B23K 26/0608 |
| | | | 219/121.76 |
| 8,546,724 B2 | 10/2013 | Yilbas et al. | |
| 9,102,007 B2 | 8/2015 | Hosseini | |
| 9,102,011 B2 | 8/2015 | Hosseini | |
| 2007/0045256 A1 * | 3/2007 | Kurahashi | B23K 1/0056 |
| | | | 219/121.73 |
| 2013/0126573 A1 | 5/2013 | Hosseini et al. | |
| 2014/0076870 A1 * | 3/2014 | Hirano | B23K 26/0604 |
| | | | 219/121.75 |
| 2015/0034612 A1 | 2/2015 | Hosseini | |
| 2015/0034613 A1 | 2/2015 | Hosseini | |
| 2015/0038313 A1 | 2/2015 | Hosseini | |
| 2015/0044416 A1 | 2/2015 | Hosseini | |
| 2015/0118522 A1 | 4/2015 | Hosseini | |
| 2015/0121960 A1 | 5/2015 | Hosseini | |
| 2015/0122656 A1 | 5/2015 | Hosseini | |
| 2015/0136743 A1 | 5/2015 | Hosseini | |
| 2015/0140229 A1 | 5/2015 | Hosseini | |
| 2015/0140241 A1 | 5/2015 | Hosseini | |
| 2015/0140735 A1 | 5/2015 | Hosseini | |
| 2015/0151380 A1 | 6/2015 | Hosseini | |
| 2015/0165548 A1 * | 6/2015 | Marjanovic | B23K 26/083 |
| | | | 428/43 |
| 2015/0246415 A1 | 9/2015 | Hosseini | |
| 2016/0016257 A1 | 1/2016 | Hosseini | |

OTHER PUBLICATIONS

Heidrich et al., "Developement of a Laster Based Process Chain for Manufacturing Freeform Optics," Physics Procedia vol. 12, 2011, pp. 519-528. 10 pages.

Herman, Peter R., "Trends in Microprocessing and Emerging Applications Enabled by Short Pulsed Lasters," Photonics for Ship Building Workshop, Halifax, NS, Nov. 19-20, 2012, slideshow presentation. 71 Slides.

Vega et al., "Laser Application for Optical Glass Polishing," Opt. Eng. vol. 37, No. 1, Jan. 1, 1998, DOI: 10.1117/1.601614, pp. 272-279.

Hildebranda et al., "Laser Beam Polishing of Quartz Glass Surfaces," Plysics Procedia vol. 12, 2011, pp. 452-461. 10 pages.

* cited by examiner

LASER CUTTING ARRAY WITH MULTIPLE LASER SOURCE ARRANGEMENT

CROSS-REFERENCE TO RELATED APPLICATIONS

This application claims the benefit of U.S. Provisional Patent Application Ser. No. 62/173,834 filed Jun. 10, 2015 entitled "APPARATUS AND METHODS FOR LASER CUTTING."

BACKGROUND

Cutting or shaping an article, such as hard disk media, implements mechanical scribing of a substrate. The substrate may include glass or quartz, wherein the scribing causes micro-fractures to form. A tapping step is then employed to separate the article from the substrate. However, the tapping step creates micro-shock waves which further fracture and splinter the article. Accordingly, additional steps are implemented to fix damage to the article, thereby increasing the overall time and cost of production.

SUMMARY

Provided herein is an apparatus that includes a first and second laser source. The first and second laser sources are each operable to cut a substrate and are each independently movable with respect to one another. Further, the first and second laser sources are included within a multitude of laser sources that are arranged in a circular array.

These and other aspects and features may be better understood with reference to the following drawings, description, and appended claims.

BRIEF DESCRIPTION OF DRAWINGS

The presently described apparatus is illustrated by way of example, and not by way of limitation, in the figures of the accompanying drawings and in which like reference numerals refer to similar elements.

DESCRIPTION

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements of any of several other embodiments described here.

It should also be understood that the terminology used herein is for the purpose of providing some particular embodiments, and the terminology does not limit the scope of the concepts provided herein. Unless indicated otherwise, ordinal numbers (e.g., first, second, third, etc.) are used to distinguish or identify different features or steps in a group of features or steps, and do not supply a serial or numerical limitation. For example, "first," "second," and "third" features or steps need not necessarily appear in that order, and the particular embodiments need not necessarily be limited to the three features or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise. Unless defined otherwise, all technical and scientific terms used herein have the same meaning as commonly understood to which the embodiments pertain.

The embodiments described below utilize a multitude of laser sources for cutting or shaping a substrate such that the substrate may be separated into two or more articles that are substantially defect free. For example, substantially defect free glass hard disk substrates may be cut, thereby avoiding defects such as micro-fractures caused by other methods. In addition, the arrangement of multiple laser sources allows for circular cutting or shaping of the outer and internal diameters of the glass substrate, further permitting the hard disk substrate to be cut with smooth edge chamfering and to retain a high dimensional integrity.

Various embodiments may also include laser source arrangements that are configured to cut the substrate into multiple articles simultaneously and in parallel. In addition, the size, shape, thickness, and strength of the articles may be formed by controlling the focus, energy density, incidence angle, wavelength, polarization, or coherence length of the multiple laser sources.

Figure 1:
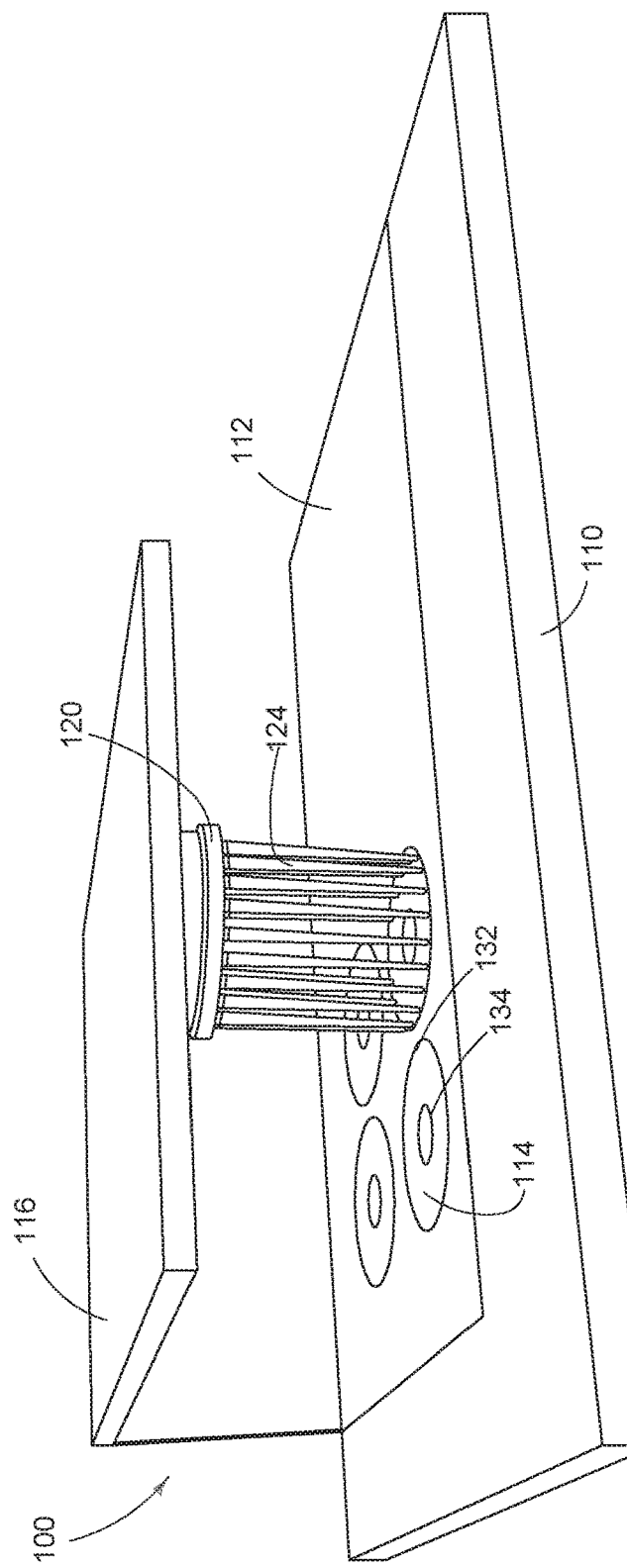
FIG. 1 illustrates a front-view of the laser cutting apparatus wherein a laser cutting array is attached to a laser carriage, according to one aspect of the present description.

Referring now to FIG. 1, a front-view of an apparatus 100 wherein a laser cutting array 120 is attached to a laser carriage 116 is shown in accordance with the embodiments described herein. In various embodiments, the apparatus 100 also includes a movable platform 110 for supporting a substrate 112. The substrate 112 may include a transparent or semi-transparent material. For example, the substrate 112 may be glass, quartz, an organic polymer (e.g., plastic) or any other suitable transparent or semi-transparent material.

The laser cutting array 120 includes a multitude of laser sources (not shown in FIG. 1) wherein the laser sources are positioned in various arrangements. In some embodiments, the laser sources (e.g., laser diodes) of the laser cutting array 120 are arranged in a multitude of concentric circles. Alternative embodiments may include linear, elliptical, square, or rectangular arrangements of the laser sources. In additional embodiments, the laser cutting apparatus 100 may also include more than one of the laser cutting array 120 such that the laser cutting apparatus 100 may cut and/or shape a multitude of articles 114 from the substrate 112 simultaneously.

During a laser cutting and/or shaping operation, the laser cutting array 120 may cut and/or shape the substrate 112 into one or more of the articles 114 by emitting a multitude of laser beams 124 (e.g., photons, light energy). The laser cutting array 120 may implement various types of laser cutting technologies to cut and/or shape the substrate 112 into one or more of the articles 114 including, for example, thermal infrared lasers, pulsed laser beams, and thermal transparent laser.

For example, during a laser cutting and/or shaping operation utilizing thermal infrared laser technology, a $CO_2$ laser is used to heat the substrate 112 to a temperature that enables a separation process (i.e., the cutting and/or shaping of the substrate 112 into one or more of the articles 114). In some embodiments, a subsequent cooling means, such as cold water or a cool gas jet, may be used to fracture the substrate 112 in the approximate direction determined the by the laser beams 124.

In another example, during a laser cutting and/or shaping operation utilizing pulsed laser cutting technology, the laser beams 124 are emitted in high power bursts for a short period of time. These high power bursts create features in the substrate 112 such as cracks, fractures or filaments. The features then are used to guide cleaving along an intended path, thereby separating the one or more of the articles 114 from the substrate 112.

In a further example, during a laser cutting and/or shaping operation utilizing thermal transparent laser cutting technology, the laser beams 124 are emitted with a high number aperture such that the laser beams 124 modify the chemistry of the substrate 112. By modifying the chemistry of the substrate 112, one or more of the articles 114 may be separated from the substrate 112.

In various embodiments, the laser cutting array 120 may be configured to cut and/or shape an inner perimeter 134 and an outer perimeter 132 of the article 114. In some embodiments, the inner perimeter 134 and the outer perimeter 132 are cut and/or shaped simultaneously. In alternative embodiments, the inner perimeter 134 and the outer perimeter 132 are cut/and or shaped in succession (e.g., the laser cutting array 120 may cut and/or shape the inner perimeter 134 first and the outer perimeter 132 second, and vice versa).

The laser cutting apparatus 100 may also include the moving platform 110, which is configured to support, move, and position the substrate 112. In some embodiments, the moving platform 110 may be, for example, a conveyer belt configured to move the substrate 112 beneath the laser cutting array 120. In various embodiments, the moving platform 110 may be the exact size of the substrate 112. In alternative embodiments, the moving platform 110 may be either larger or smaller than the size of the substrate 112. In some embodiments, the moving platform 110 includes material(s) that are not affected by the laser beams 124. In further embodiments the moving platform 110 may move the substrate 112 in three dimensions (e.g., up, down, left, right, forward, and backward).

As such, during a laser cutting and/or shaping operation, the moving platform 110 may move vertically and/or move horizontally. For example, moving platform 110 may be raised to move the substrate 112 closer to the laser cutting array 120 or may be lowered to move the substrate 112 further away from the laser cutting array 120. In various embodiments, the distance between the substrate 112 and the laser cutting array 120 may be used to control, for example, the energy density, incidence angle, or coherence length of the laser beams 124.

Figure 2A:
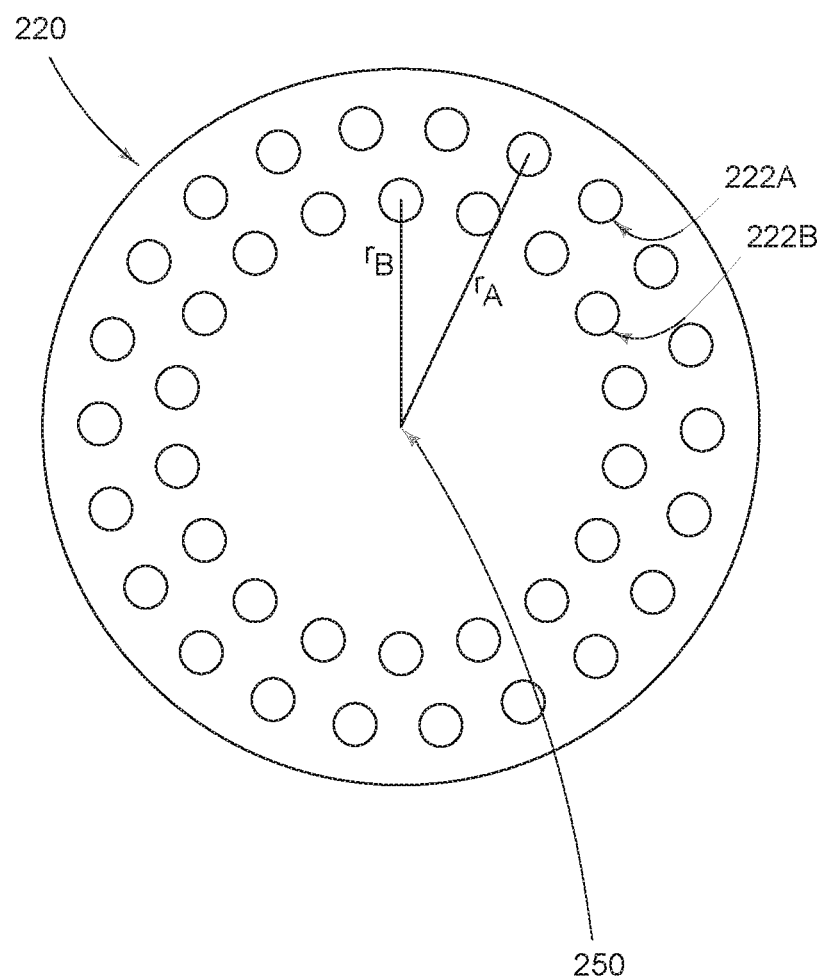
FIG. 2A illustrates a front-view of an arrangement of multiple laser sources of a laser cutting apparatus wherein the arrangement includes two concentric circles of laser sources, according to one aspect of the present description.

Referring now to FIG. 2A, a front-view of a laser cutting array 220 is shown in accordance with embodiments described herein. In the illustrated embodiment, the laser cutting array 220 includes an arrangement of two concentric circles (e.g., rings), including a first circle of laser sources 222A and a second circle of laser sources 222B. Alternative embodiments (not shown) may include linear, elliptical, square, or rectangular arrangements of laser sources, as well as any number of circles of lasers. It is understood that these arrangements are exemplary and any arrangement of laser sources (e.g., laser diodes) may be used.

In some embodiments, the first circle of laser sources 222A may be positioned at a radius $r_A$ from a center 250 of the laser cutting array 220 and the second circle of laser sources 222B may be positioned at a radius $r_B$ from the center 250. In a non-limiting example, the $r_A$ may be 95 mm and the $r_B$ may be 65 mm, however it is understood that $r_A$ and $r_B$ may be any number greater than zero. Accordingly, in this non-limiting example, the second circle of laser sources 222B is smaller than the larger first circle of laser sources 222A, as well as positioned inside of the first circle of laser sources 222A.

In some embodiments, the laser sources 222A and the laser sources 222B are each configured to rotate and/or reciprocate about the center 250 of the laser cutting array 220. In other embodiments, a subset of the first circle of laser sources 222A (not shown) may also a be a subset of the second circle of laser sources 222B (not shown). For example, one or more laser sources within the first circle of laser sources 222A may additionally form a portion of the second circle of laser sources 222B.

In various embodiments, in a laser cutting and/or shaping operation, the laser cutting array 220 may cut and/or shape the substrate 112 (shown in FIG. 1) such that the shape of one or more of the resulting articles 114 (shown in FIG. 1) exactly reflect the arrangement of the laser sources 222A and 222B. In a non-limiting example, the outer circle of laser sources 222A may have the $r_A$ 95 mm and the inner circle of laser sources 222B may have the $r_B$ 65 mm, however it is understood that $r_A$ and $r_B$ may be any number greater than zero. In this non limiting example, the resulting article 114 would reflect the same dimensions, i.e., the laser sources 222A would cut and/or shape the first circular shape with outer diameter 132 (shown in FIG. 1) and with the $r_A$ 95 mm and laser sources 222B would cut and/or shape the second circular shape with the inner diameter 134 (shown in FIG. 1) and with the $r_B$ 65 mm.

In an alternative non-limiting embodiment, only the laser sources 222B may be utilized in the a laser cutting and/or shaping operation (e.g., the laser sources 222A remain in a dormant or an "off" setting or are not present). For example, the laser sources 222B may cut and/or shape the substrate 112 such that the resulting article 114 has an outer diameter 132 with the radius $r_B$ and has no inner diameter 134 (i.e., the laser cutting array 220 cuts the articles 114 such that the article 114 is one uniform circular shape).

In other embodiments the laser cutting array 220 may be configured to cut and/or shape the substrate 112 from a multitude of angles. In a non-limiting example, the laser cutting array 220 may be configured to cut and/or shape the article 114 such that the laser sources 222A cut and/or shape both the outer diameter 132 and the inner diameter 134 (e.g., the laser sources 222B remain in a dormant or an "off" setting or are not present). In this non-limiting example, the laser sources 222A may be positioned at a certain angle to cut and/or shape the outer diameter with radius $r_A$ and may then be angled inward toward the center 250 to cut and/or shape the inner diameter with radius $r_B$.

Similarly, the laser cutting array 220 may be configured to cut and/or shape the article 114 such that the laser sources 222B (rather than the laser sources 222A) cut and/or shape the outer diameter 132 and the inner diameter 134 (e.g. the laser sources 222A remain in a dormant or an "off" setting or are not present). In this non-limiting example, the laser sources 222B may be positioned at a certain angle to cut and/or shape the inner diameter 134 with radius $r_B$ and may then be angled radially outward from the center 250 to cut and/or shape the outer diameter 132 with the radius $r_A$.

The laser cutting array 220 may additionally be configured such that the power of the laser beams 124 (shown in FIG. 1) emitted from the laser sources 222A and 222B may be adjusted. For example, in an operation for laser cutting and/or shaping, the speeds at which the outer perimeter 132 and the inner perimeter 134 may be cut and/or shaped may be adjusted such that both are finished being cut and/or shaped simultaneously.

In a non-limiting example, the laser cutting sources 222A may cut and/or shape the article 114 such that the smaller inner perimeter 134 is cut and/or shaped at a slower rate than the larger outer perimeter 132. This allows the inner perimeter 134 and the outer perimeter 132 to finish being cut and/or shaped simultaneously. In alternative embodiments, the outer perimeter 132 and the inner perimeter 134 may be cut and/or shaped at different times. For example the first circle of laser sources 222A may cut and/or shape the outer perimeter 134 first and then may cut and/or shape the inner perimeter 132 (and vice versa).

Figure 2B:
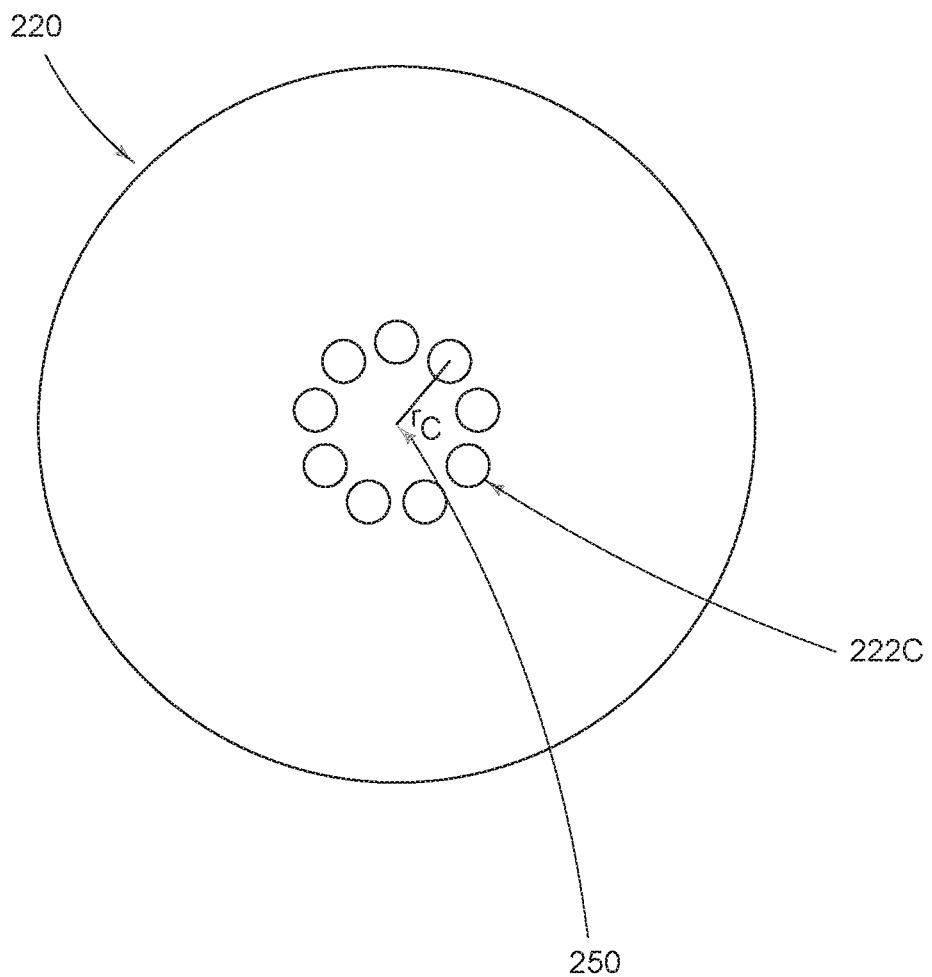
FIG. 2B illustrates a front-view of an alternative arrangement of multiple laser sources of the laser cutting apparatus wherein the arrangement includes one circle of laser sources, according to one aspect of the present description.

Referring now to FIG. 2B, a front-view of the laser cutting array 220 wherein a third circle of laser sources 222C (e.g., laser diodes) is arranged in a single circle (e.g., ring) is shown in accordance with embodiments described herein. Alternative embodiments (not shown) may include linear, elliptical, square, or rectangular arrangements of laser sources. It is understood that these arrangements are exemplary and any arrangement of laser sources may be used.

In a laser cutting and/or shaping operation, the laser cutting array 220 may cut and/or shape the substrate 112 (shown in FIG. 1) such that the shape of one or more of the resulting articles 114 (shown in FIG. 1) reflects the arrangement of laser sources 222C. In a non-limiting example, the laser sources 222C may cut and/or shape the substrate 112 such that the resulting article 114 has the inner diameter 134 (shown in FIG. 1) with the radius $r_C$.

In an alternative embodiments the laser cutting array 220 may be configured to cut and/or shape substrate 112 from a multitude of angles. For example, the laser cutting array 220 may be configured such that the laser sources 222C may cut and/or shape both the outer diameter 132 (shown in FIG. 1) and the inner diameter 134. In a non limiting example, the laser sources 222C may be positioned at a certain angle to cut and/or shape the inner diameter 134 with radius $r_C$ and then may be angled radially outward from the center 250 to cut and/or shape the outer diameter 132 with the radius $r_A$ (shown in FIG. 2A). Alternatively, after cutting the outer perimeter 132, the laser sources 222C may be angled radially outward from the center 250 such that outer diameter 132 may be cut and/or shaped with the radius $r_B$ (shown in FIG. 2A).

Figure 2C:
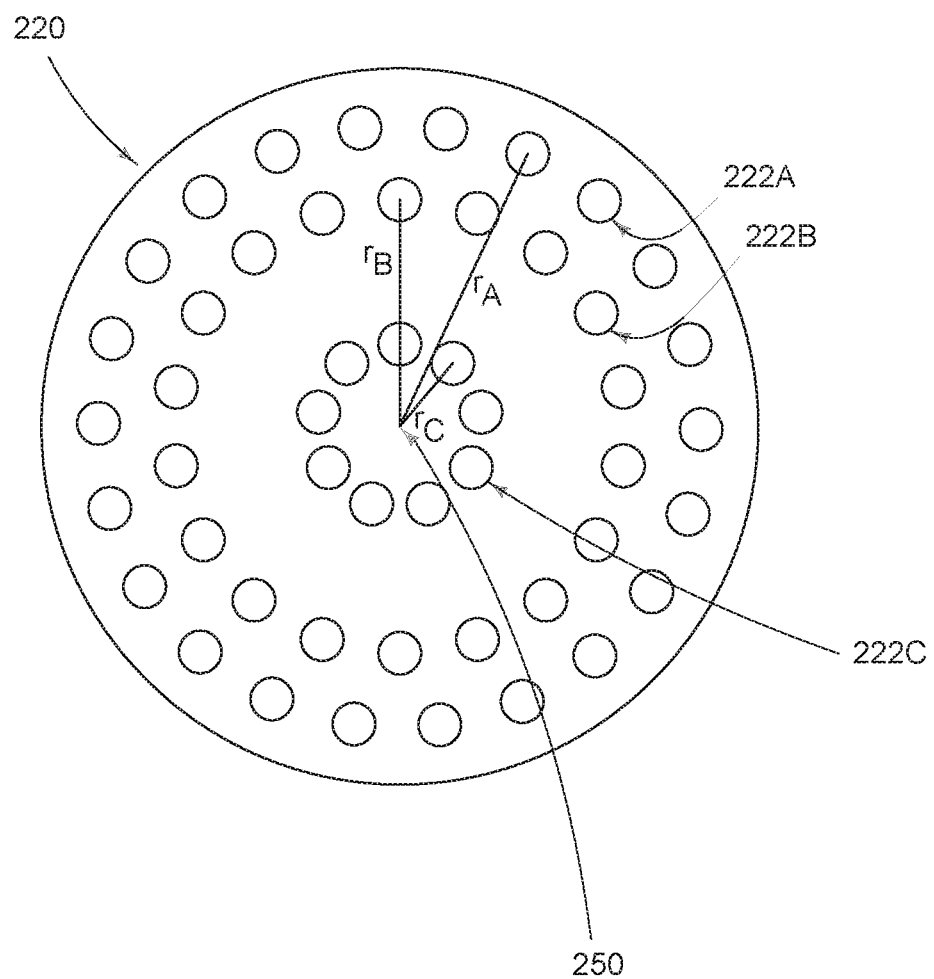
FIG. 2C illustrates a front-view of an another alternative arrangement of multiple laser sources of the laser cutting apparatus wherein the arrangement includes three concentric circles of laser sources, according to one aspect of the present description.

Referring now to FIG. 2C, a front-view of the laser cutting array 220 with an alternative arrangement of the laser sources 222A, 222B, and 222C is shown in accordance with the embodiments described herein. In the illustrated embodiment, the laser cutting array 220 includes three concentric circles (e.g., rings) of laser sources (e.g., laser diodes), including the first circle of laser sources 222A, positioned at a radius $r_A$ from the center 250 of the laser cutting array 220, the second circle of laser sources 222B, positioned at a radius $r_B$ from the center 250, and the third circle of laser sources 222C, positioned at a radius $r_C$ from the center 250.

In a non-limiting example, the $r_A$ may be 95 mm, the $r_B$ may be 65 mm, and the $r_C$ may be 35 mm, however it is understood that $r_A$, $r_B$ and $r_C$ may be any number greater than zero. Accordingly, in this non-limiting example, the first circle of laser sources 222A has the largest diameter, the second circle of laser sources 222B has the second largest diameter, and the third circle of laser sources 222C has the smallest diameter.

In some embodiments, the laser sources 222A, 222B, and 222C are each configured to rotate and/or reciprocate about the center 250 of the laser cutting array 220. In other embodiments, a subset of the first circle of laser sources 222A (not shown) may also a be a subset of the second circle of laser sources 222B (not shown). For example, one or more laser sources within the first circle of laser sources 222A may additionally form a portion of the second circle of laser sources 222B. In an alternative example, a subset of the first circle of laser sources 222A may also form a portion of the third circle of laser sources 222C such that all three concentric circles share a subset of laser sources (not shown).

In a laser cutting and/or shaping operation, the laser cutting array 220 cuts and/or shapes the substrate 112 (shown in FIG. 1) such that the shape of one or more of the resulting articles 114 (shown in FIG. 1) exactly reflects the shape of the arrangement of the laser sources 222A, 222B, and/or 222C. In a non-limiting example, the first of laser sources 222A may have the $r_A$ 95 mm, the second circle of laser sources 222B may have the $r_B$ 65 mm, and the third circle of laser sources may have the $r_C$ 35 mm, however it is understood that $r_A$, $r_B$, and $r_C$ may be any number greater than zero.

In this non limiting example, the substrate 112 may be cut and/or shaped such that the resulting article 114 reflects dimensions identical to the arrangement of laser sources 222A, 222B, and/or 222C. For example, the laser sources 222A may cut and/or shape the outer diameter 132 (shown in FIG. 1) with the $r_A$ 95 mm and the laser sources 222C would cut and/or shape the inner diameter 134 (shown in FIG. 1) with the $r_C$ 35 mm (e.g., the laser sources 222B remain in a dormant or an "off" setting or are not present). In an alternative example, the laser sources 222B may cut and/or shape the outer diameter 132 with the $r_B$ 65 mm and the laser sources 222C would cut and/or shape the inner diameter 134 with the $r_C$ 35 mm (e.g., the laser sources 222A remain in a dormant or an "off" setting or are not present).

In some embodiments, the laser cutting array 220 may additionally be configured such that the power of the laser beams 124 (shown in FIG. 1) emitted from the laser sources 222A, 222B, and 222C may be adjusted. For example, in an operation for laser cutting and/or shaping, the laser sources 222B may cut and/or shape the inner perimeter 134 with the radius $r_B$ at a slower rate than the laser sources 222A cut and/or shape the outer perimeter 132 with the radius $r_A$ such that the laser cutting array 220 finishes cutting and/or shaping the inner perimeter 134 and the outer perimeter 132 simultaneously.

In another example, the laser sources 222C (rather than the laser sources 222B) may cut and/or or shape the inner perimeter 134 with the radius $r_C$ (rather than the radius $r_B$). In this non-limiting example, the radius $r_C$ may be smaller than the radius $r_B$ and thus may be cut and/or shaped at a slower rate than which the inner perimeter 134 with the radius $r_B$ was cut such that the laser cutting array 220 finishes cutting and/or shaping the inner perimeter 134 and the outer perimeter 132 simultaneously. Alternatively, the laser sources 222A may cut and/or shape the outer perimeter 132 with a radius of $r_A$ at a faster rate such that the laser cutting array 220 finishes cutting and/or shaping the inner perimeter 134 and the outer perimeter 132 simultaneously. In other embodiments, the outer perimeter 132 and the inner perimeter 134 may be cut at different times. For example, the laser cutting array 220 may cut and/or shape the outer perimeter 132 first, and the inner perimeter 134 second, or vice versa.

Further, in various embodiments the laser sources 222A, 222B, and 222C may be configured to cut and/or shape the substrate 112 at multiple angles. Thus, multiple combinations of the first circle of laser sources 222A, the second circle of laser sources 222B, and the third circle of laser sources 222C may be used for cutting the outer perimeter 132 and the inner perimeter 134.

For example, the laser sources 222A may be configured to cut the article 114 with the outer diameter 132 with the radius $r_A$ and may then be angled radially inward toward the center 250 to cut and/or shape the inner diameter 134 with the radius $r_B$ (e.g., the laser sources 222B and 222C remain in a dormant or an "off" position or are not present). Alternatively, the laser sources 222C may be angled radially outward from the center 250 to cut and/or shape the outer diameter 132 with the radius $r_A$ while the laser sources 222B are angled radially inward toward the center 250 to cut and/or shape the inner diameter 134 with the radius $r_C$ (e.g., the laser sources 222A remain in a dormant or an "off" position or are not present).

Figure 3B:
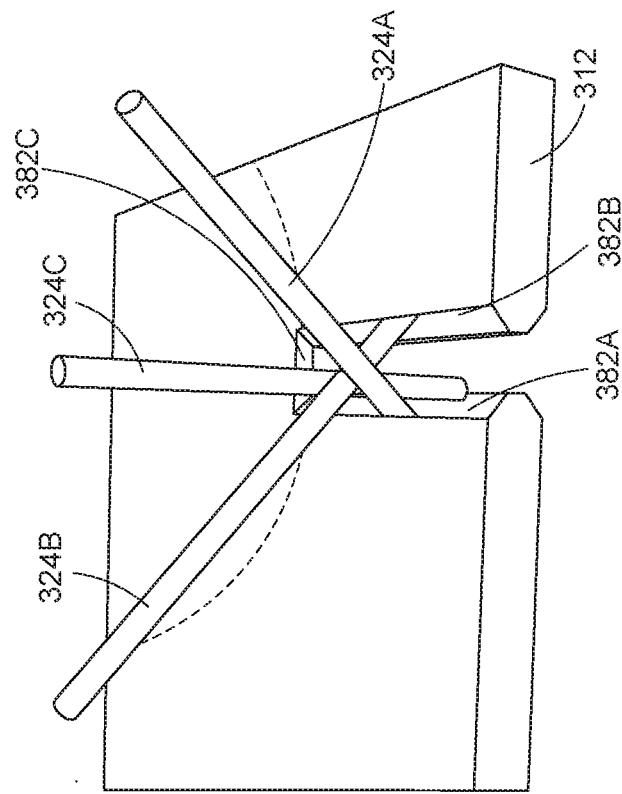
FIG. 3B illustrates a side-view of multiple laser sources shaping an outer diameter of the article from various angles, according to one aspect of the present description.
Figure 3A:
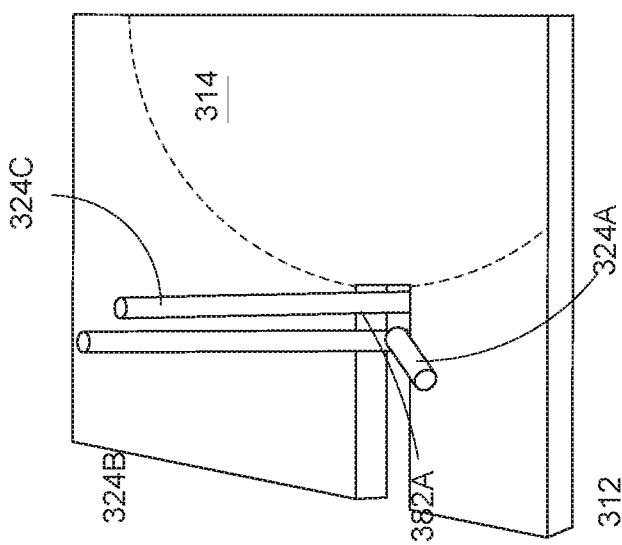
FIG. 3A illustrates a front-side view of multiple laser sources shaping an outer diameter of an article from various angles, according to one aspect of the present description.

Referring now to FIGS. 3A-3B, a front-side view and a side view, respectively, of a first laser beam 324A, a second laser beam 324B, and a third laser beam 324C cutting and/or shaping an article 314 at a multitude of angles are shown in accordance with embodiments described herein. It is understood that these arrangements are exemplary and any arrangement of laser beams may be used.

In a laser shaping operation, the laser beams (e.g., photons, light energy) 324A, 324B, an 324C may each be configured to cut and/or shape a surface of the article 314. For example, the first laser 324A may be configured to shape a first surface 382A, the second laser 324B may be configured to shape a second surface 382B, and the third laser 324C may be configured to shape a third surface 382C. In various embodiments the shaping operation may include, for example, chamfering, beveling, smoothing, or removing defects from the surfaces 382A, 382B, and 382C.

In alternative embodiments the second laser beam 324B and the third laser beam 324C may be positioned to shape the second surface 382B and the third surface 382C of the article, respectively. In this embodiment, the first laser beam 324A may cut (rather than shape) the article 314 from a substrate 312. In alternative embodiments, various other combinations of laser beams 324A, 324B, and 324C may be used for cutting and shaping the article 314.

In a non-limiting example, the laser beam 324C may cut the article 314 from the substrate 312 while laser beams 324A and 324B shape the surface 383A and 382B, respectively. In another non-limiting example, as shown in FIG. 3B, the first laser beam 324A and the second laser beam 324B may be angularly positioned to oppose one another (forming a scissors configuration) for the shaping of the first surface 382A and a second surface 382B of the article 314.

Figure 4:
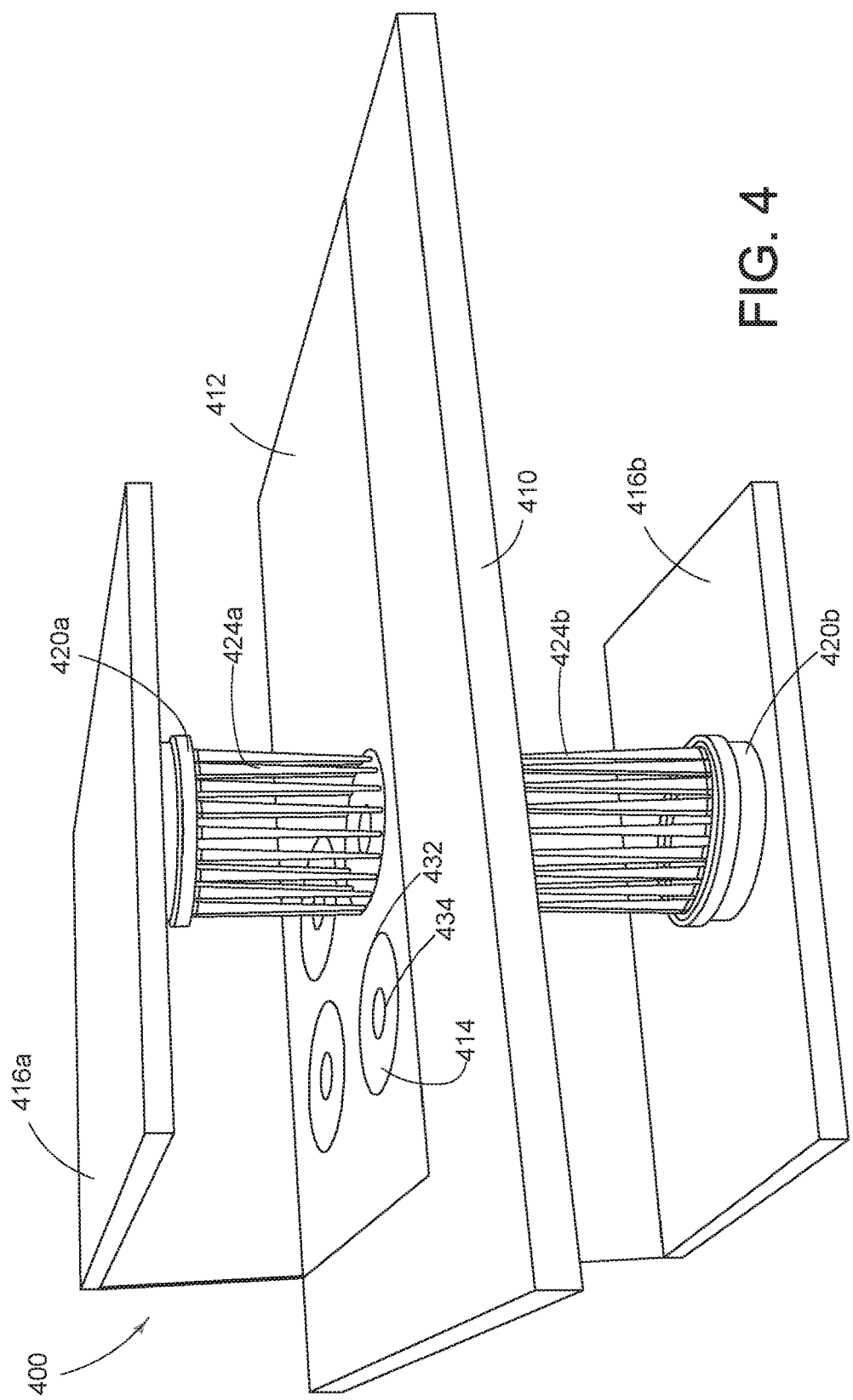
FIG. 4 illustrates a front-view of the laser cutting apparatus wherein multiple laser sources are positioned both above and below a substrate, according to one aspect of the present description.

Referring now to FIG. 4, a front-view of apparatus 400 wherein a top laser cutting array 420a and a bottom laser cutting array 420b are respectively positioned above and below a substrate 412 is shown in accordance with embodiments described herein.

In some embodiments, the apparatus 400 may include the top laser cutting array 420a attached to a top laser carriage 416a and the bottom laser cutting array 420b attached to a bottom laser carriage 416b. In various embodiments, the apparatus 400 also includes a movable platform 410 for supporting a substrate 412. The substrate 412 may include a transparent or semi-transparent material. For example, the substrate 412 may be glass, quartz, an organic polymer (e.g. plastic) or any other suitable transparent or semi-transparent material.

The top laser cutting array 420a and the bottom laser cutting array 420b may each include a multitude of laser sources (shown in FIG. 2A-2C). The laser sources of the laser cutting arrays 420a and 420b may have numerous different arrangements. In some embodiments, the top laser cutting array 420a and the bottom laser cutting array 420b may include laser sources arranged in multitude of concentric circles. Alternative embodiments (not shown) may include linear, elliptical, square, or rectangular arrangements of laser sources. Additionally, various embodiments of the apparatus 400 may include more than the two laser cutting arrays 420a and 420b. For example, the apparatus 400 may include a third and a fourth laser cutting array (not shown).

During a laser cutting and/or shaping operation, the top laser cutting array 420a and the bottom laser cutting array 420b may cut and/or shape the substrate 412 into one or more articles 414 by emitting laser beams (e.g., photons, light energy) 424a and 424b, respectively. The laser cutting arrays 420a and 420b may also cut and/or shape the substrate 412 in various ways. In some embodiments, the top laser cutting array 420a and the bottom laser cutting array 420b may simultaneously cut and/or shape a single article 414 from the substrate 412. In alternative embodiments, the top laser cutting array 420a may cut/and or shape the article 414 while 420b simultaneously cuts and/or shapes a separate article (not shown) from the substrate 412.

The top laser cutting array 420a and the bottom laser cutting array 420b may implement various types of laser cutting technologies to cut and/or shape substrate 412 into one or more articles 414 including, for example, thermal infrared lasers, pulsed laser beams, and thermal transparent laser.

For example, during a laser cutting and/or shaping operation utilizing thermal infrared laser technology, a $CO_2$ laser is used to heat the substrate 412 to a temperature that enables a separation process (i.e., the cutting and/or shaping of the substrate 412 into the article 414). In some embodiments, a subsequent cooling means, such as cold water or a cool gas jet, may be used to fracture the substrate 412 in the approximate direction determined by the laser beams 424a and/or 424b.

In another example, during a laser cutting and/or shaping operation utilizing pulsed laser cutting technology, the laser beams 424a and/or 424b are emitted in high power bursts for a short period of time These high power bursts create features in substrate 412 such as cracks, fractures or filaments. The features then are used to guide cleaving along an intended path thereby separating one or more of the articles 414 from the substrate 412.

Alternatively, during a laser cutting and/or shaping operation utilizing thermal transparent laser cutting technology, the laser beams 424a and/or 424b are emitted with a high number aperture such that the laser beams 424a and/or 424b modify the chemistry of the substrate 412. By modifying the chemistry of the substrate 412, one or more of the articles 414 may be separated from the substrate 412.

In various embodiments, the laser cutting arrays 420a and 420b are configured to cut and/or shape an inner perimeter 434 and an outer perimeter 432 of the article 414. In some embodiments, the inner perimeter 434 and the outer perimeter 432 are cut and/or shaped simultaneously. In alternative embodiments, the inner perimeter 434 and the outer perimeter 432 are cut/and or shaped in succession (e.g., the laser cutting array 420a and/or the laser cutting array 420b may cut and/or shape the inner perimeter 434 first and the outer perimeter 432 second, and vice versa).

The apparatus 400 may additionally include the moving platform 410, which is configured to support, move, and position the substrate 412. In some embodiments, the moving platform 410 may be, for example, a conveyer belt configured to move the substrate 412 beneath the top laser cutting array 420a and/or above the bottom laser cutting array 420b. In various embodiments, the moving platform 410 may be the exact size of the substrate 412. In alternative embodiments, the moving platform 410 may be either larger or smaller than the size of the substrate 412. In some embodiments, the moving platform 110 includes material(s) that are not affected by the laser beams 424a and/or 424b. In further embodiments the moving platform 410 may move the substrate 412 in three dimensions (e.g., up, down, left, right, forward, and backward).

As such, during a laser cutting and/or shaping operation, the moving platform 410 may be configured to move vertically and/or horizontally. For example, moving platform 410 may be raised to move the substrate 412 closer to the top laser cutting array 420a or may be lowered to move the substrate 412 further away from the top laser cutting array 420a and closer to the bottom laser cutting array 420b. In various embodiments, the distance between the substrate 412 and the laser cutting arrays 420a and 420b may be used to control the energy density, incidence angle or coherence length of the laser beams 424a and 424b, respectively.

Figure 5:
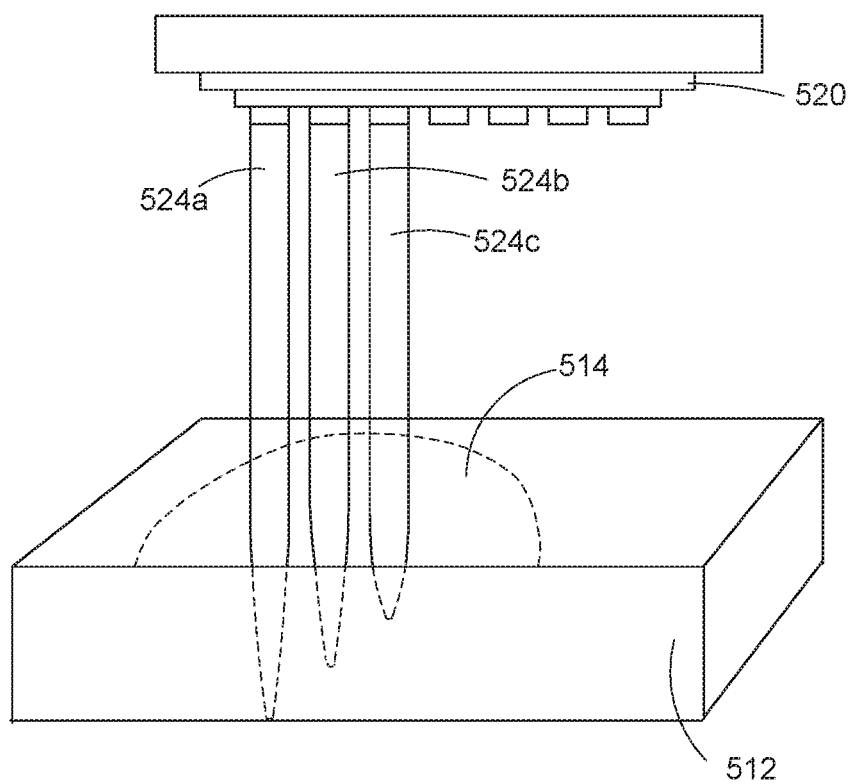
FIG. 5 illustrates a front-side view of multiple laser sources cutting an article from a substrate wherein the laser sources each cut the substrate at differing depths, according to one aspect of the present description.

Referring now to FIG. 5, a front-side view of a first laser 524a, a second laser 524b, and a third laser 524c, each cutting and/or shaping an article 514 from a substrate 512 at a multitude of depths is shown in accordance with embodiments described herein.

In some embodiments, the first laser 524a may cut through substrate 512 in its entirety, the second laser 524b may only cut halfway through substrate 512, and the third laser 524c may cut through a substantial portion of the substrate 512 but fail to cut through the substrate 512 in its entirety. In other embodiments, the laser beams 524a, 524b, and 524c may each cut through the substrate 512 at the same depth. Alternatively, the laser beams 524a, 524b, and 524c may have multiple lasers cut through the substrate 512 at identical depths and simultaneously may have multiple lasers cut through substrate 512 at different depths. For example, the laser beams 524a and 524b may cut through the substrate 512 in its entirety, while the laser beam 524c only partially cuts through the substrate 512.

Figure 6:
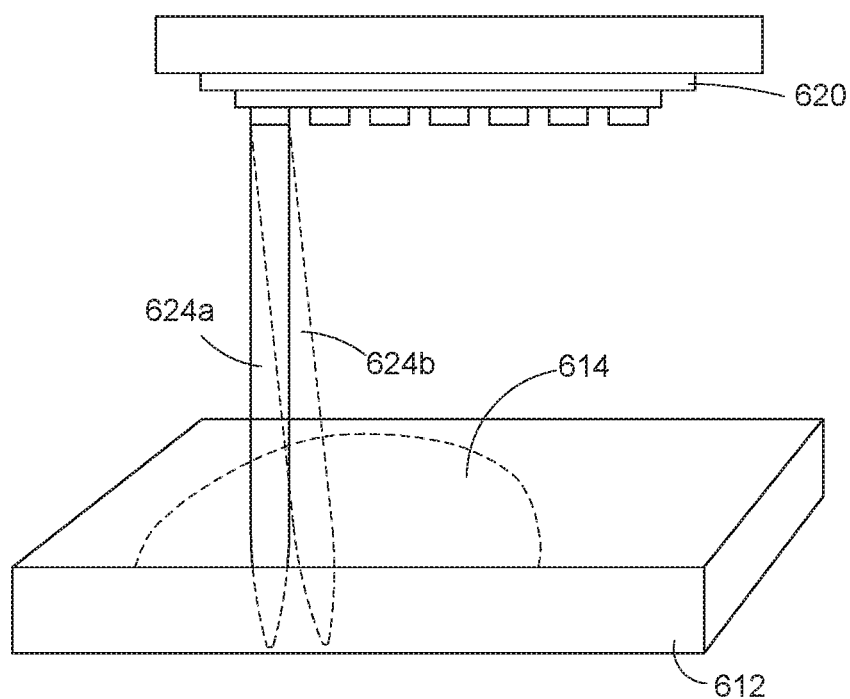
FIG. 6 illustrates a front-side view of a laser source cutting an article from a substrate wherein the laser source may cut the article by using a radial piezo movement, according one aspect of the present description.

Referring now to FIG. 6, a front-side view of a laser cutting array 620 wherein the laser cutting array 620 is configured to cut and/or shape an article 614 from a substrate 612 by using a radial inverse piezoelectrical effect is shown in accordance with embodiments described herein.

It is understood that a radial inverse piezoelectrical effect converts electrical energy into mechanical motion wherein the range of mechanical movement generated by the piezoelectrical effect is very small, from 1 μm to 100 μm. Such small movements allow for greater precision. Accordingly, in non-limiting embodiments wherein a high level of precision is preferred in cutting the substrate 612 (for example, the cutting and/or shaping of hard disk media), the laser cutting array may be configured to cut and/or shape the substrate 612 by using radial inverse piezoelectrical movements. For example, during a laser cutting and/or shaping operation, the laser cutting array 620 may emit a laser beam (e.g., photons, light energy) 624a, which may then be moved via a radial inverse piezoelectrical movement 624b, to cut and/or shape the article 614.

Thus, various non-limiting embodiments of the present device have been described. Such embodiments of the laser cutting apparatus may cut and/or shape a hard disk media from a glass substrate wherein the resulting hard disk media is substantially defect free.

In some embodiments, the laser cutting array may be a circular array. For example, FIG. 1 illustrates circular laser cutting array 120 and FIG. 4 illustrates circular laser cutting arrays 420a and 420b. Various embodiments additionally include the laser cutting array wherein the numerous laser sources are arranged in two concentric rings of laser sources. For example, FIG. 2A illustrates a laser cutting array with a first circle of laser sources 222A and a second circle of laser sources 222B.

Additional embodiments include a laser cutting array that includes multiple laser sources (e.g., laser diodes) where the laser sources may be configured to cut and/or a shape a substrate from numerous angle and at varying depths. For example, FIG. 6 illustrates an embodiment wherein the laser cutting array may cut and/or shape the substrate at varying angles and FIG. 5 illustrates a laser cutting array that cuts and/or shapes the substrate at various depths.

Various embodiments include a laser cutting apparatus which includes a movable platform for supporting the substrate. For example, FIGS. 1 and 4 illustrates a moving platform which may be configured to move vertically and/or horizontally. Accordingly, the moving platform may be raised or lowered to respectively move the substrate closer or further from the laser cutting array. Further, the moving platform may move in a horizontal direction. In some embodiments, the moving platform may be a conveyer belt.

Other embodiments include a laser cutting apparatus configured to simultaneously shape and cut a substrate. For example, FIGS. 3A-3B illustrate laser beams 324A, 324B, and 324C simultaneously cutting and shaping a portion of the substrate 312.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications may be encompassed by the embodiments. Accordingly, departures may be made from the foregoing embodiments and/or examples without departing from the scope of the concepts described herein. The implementations described above and other implementations are within the scope of the following claims.

The invention claimed is:

1. An apparatus comprising:
    a first laser source positioned to cut a substrate, wherein the substrate is a transparent material; and
    a second laser source positioned to cut the substrate, wherein
        the first laser source and the second laser source emit laser beams for cutting the substrate;
        the first laser source and the second laser source are independently movable with respect to one another during operation of the first laser source and the second laser source, and
        the first laser source and the second laser source are included within a plurality of laser sources arranged in a circular array.

2. The apparatus of claim 1 wherein the plurality of laser sources is configured to rotate or reciprocate about a center of the circular array.

3. The apparatus of claim 1 wherein the plurality of laser sources includes two concentric rings of laser sources.

4. The apparatus of claim 1, wherein the first laser source that is independently movable is configured to be positioned to cut the substrate from a plurality of angles.

5. The apparatus of claim 1 wherein the first laser source is configured to cut the substrate at a first depth and the second laser source is configured to cut the substrate at a second depth.

6. The apparatus of claim 1 wherein the plurality of laser sources is configured to simultaneously cut the substrate and chamfer the substrate.

7. An apparatus comprising:
    a first plurality of laser sources positioned to shape a glass, wherein the first plurality of laser sources is arranged to shape an internal diameter of a portion of the glass; and
    a second plurality of laser sources positioned to shape the glass, wherein
        the first laser source and the second laser source emit laser beams for shaping the glass;
        the second plurality of laser sources is arranged to shape an outer diameter of the portion of the glass, and
        the first plurality of laser sources includes laser sources that are independently movable with respect to one another during operation of the laser sources.

8. The apparatus of claim 7 wherein the first plurality of laser sources are operable to rotate and the second plurality of laser sources are operable to reciprocate about a center of an array including the first plurality of laser sources and the second plurality of laser sources.

9. The apparatus of claim 7 wherein
    a third plurality of laser sources is configured to shape an internal diameter of an additional portion of the glass, and
    a fourth plurality of laser sources is configured to shape an outer diameter of the additional portion of the glass.

10. The apparatus of claim 7 wherein a subset of laser sources within the first plurality of laser sources is also a subset of laser sources within the second plurality of laser sources.

11. The apparatus of claim 7, wherein the first plurality of laser sources is arranged to shape the portion of the glass from a first angle and second plurality of laser sources is arranged to shape the portion of the glass from a second angle.

12. The apparatus of claim 7, wherein the first plurality of laser sources is configured to shape the substrate at a first depth and the second plurality of laser sources is configured to shape the substrate at a second depth.

13. The apparatus of claim 7 wherein the first and second plurality of laser sources are further configured to chamfer the portion of the glass.

14. An apparatus comprising:
    a first array of laser sources positioned to cut a transparent material into a first circular shape using light energy;
    a second array of laser sources positioned to cut the transparent material into a second circular shape using light energy, wherein
        the first array laser sources and the second array of laser sources emit laser beams for cutting the transparent material, and
        the first array of laser sources and the second array of laser sources include laser sources that are independently movable with respect to one another during operation of the first array of laser sources; and
    a movable platform configured to hold the transparent material.

15. The apparatus of claim 14 wherein the first and second arrays of laser sources are arranged to cut the transparent material such that the transparent material includes smooth edge chamfering.

16. The apparatus of claim 14 wherein the first array includes first laser sources configured to reciprocate about a center of the first array and the second array includes second laser sources configured to reciprocate about a center of the second array.

17. The apparatus of claim 14 wherein a third array of laser sources is configured to cut the transparent material into a third shape.

18. The apparatus of claim 14, wherein the first array of laser sources is configured to cut the transparent material at a first depth and the second array of laser sources is configured to cut the transparent material at a second depth.

19. The apparatus of claim 14 wherein the first and second arrays of laser sources are configured to simultaneously cut the transparent material and to chamfer the transparent material.

20. The apparatus of claim 14 wherein the movable platform is configured to move the transparent material horizontally and vertically.

* * * * *